United States Patent
Knopf et al.

(10) Patent No.: US 6,387,174 B2
(45) Date of Patent: May 14, 2002

(54) PRESSURE-ASSISTED MOLDING AND CARBONATION OF CEMENTITIOUS MATERIALS

(75) Inventors: F. Carl Knopf; Kerry M. Dooley, both of Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 09/829,892

(22) Filed: Apr. 10, 2001

Related U.S. Application Data

(63) Continuation of application No. 09/170,480, filed on Oct. 13, 1998.
(60) Provisional application No. 60/109,799, filed on Oct. 15, 1997.

(51) Int. Cl.$^7$ ............................................... C04B 14/28
(52) U.S. Cl. ........................ 106/738; 106/644; 106/682
(58) Field of Search .................................. 106/644, 682, 106/738; 423/419.1, 430

(56) References Cited

U.S. PATENT DOCUMENTS

| | | | |
|---|---|---|---|
| 3,356,779 A | 12/1967 | Schulze | 264/82 |
| 4,069,063 A | 1/1978 | Ball | 106/713 |
| 4,093,690 A | 6/1978 | Murray | 264/82 |
| 4,117,060 A | 9/1978 | Murray | 264/82 |
| 4,350,567 A | 9/1982 | Moorehead et al. | 162/145 |
| 4,362,679 A | 12/1982 | Malinowski | 106/601 |
| 4,407,676 A | 10/1983 | Restrapo | 106/88 |
| 4,427,610 A | 1/1984 | Murray | 264/82 |
| 5,051,217 A | 9/1991 | Alpár et al. | 264/40.1 |

(List continued on next page.)

FOREIGN PATENT DOCUMENTS

| | | |
|---|---|---|
| CH | 644828 | 8/1984 |
| DE | 4207235 | 9/1993 |
| JP | 402018368 | 1/1990 |
| JP | 406263562 | 9/1994 |
| RO | 101077 | 7/1992 |
| WO | WO9744293 | 11/1997 |
| WO | WO9744294 | 11/1997 |

OTHER PUBLICATIONS

Bernard, A. et al., "Treatment of Cement Products with Carbon Dioxide," Comm. a l'Energie Atomique Fr., 5 pages (1969).
Bukowski, J. et al., Reactivity and Strength Development of $CO_2$ Activated Non–Hydraulic Calcium Silicates, *Cement and Concrete Research*, vol. 9, pp. 57–68 (1979).
Dewaele, P. et al., "Permeability and Porosity Changes Associated with Cement Grout Carbonation," Cem. Concr. Res., v. 21(4), pp. 441–454 (1991).
Klemm, W. et al., "Accelerated Curing of Cementatious Systems by Carbon Dioxide," Cem. Concrete Res., v. 2(5), pp. 567–576 (1972).
Knopf, F. et al., "Densification and pH Reduction in Cement Mixtures Using Supercritical CO2," Abstract of paper presented at 1997 annual meeting of the American Institute of Chemical Engineers, available on the Internet in Jul. 1997 at http://www1/che.ufl.edu/meeting/1997/annual/session/100/h/index.html.
Letter from Roger H. Jones, Jr. to Tom Peck II (Oct. 29, 1996).
Ohgishi, S. et al., "Relation Between the Accelerated Test Results and Natural Progres for Carbonation in Concrete," Semento, Konkurito Ronbunshu, v. 44, pp. 454–459 (1990).
Onan, D., "Effects of Supercritical Carbon Dioxide on Well Cements," Proc. Annu. Southwest. Pet. Short Courts, 32nd, pp. 34–56 (1985).
Ota, Y. et al., "Preparation of Aragonite Whiskers," *J. Am. Ceram. Soc.*, vol. 78, 1983–1984 (1995).
Reardon, E. et al., "High Pressure Carbonation of Cementitious Grout," *Cement and Concrete Research*, vol. 19, pp. 385–399 (1989).
Šauman, Z., "Effect of $CO_2$ on Porous Concrete," *Cem. Concr. Res.*, vol. 2, pp. 541–549 (1972).
Simatupang, M., "The Carbon Dioxide Process to Enhance Cement Hydration in Manufacturing of Cement–bonded Composites—Comparison with Common Production Method," Inorg.–Bonded Wood Fiber Compos. Mater., v. 3, pp. 114–120 (1993).
Sorochkin, M. et al., "Possible Use of Carbon Dioxide to Accelerate the Hardening of Portland Cement Based Products," Zh. Prikl. Khim., v. 48(6), pp. 1211–1217 (1975).

*Primary Examiner*—Paul Marcantoni
(74) *Attorney, Agent, or Firm*—John H. Runnels

(57) ABSTRACT

A method is disclosed for rapidly carbonating large cement structures, by forming and hardening cement in a mold under high carbon dioxide density, such as supercritical or near-supercritical conditions. The method is more reliable, efficient, and effective than are post-molding treatments with high-pressure $CO_2$. Cements molded in the presence of high-pressure $CO_2$ are significantly denser than otherwise comparable cements having no $CO_2$ treatment, and are also significantly denser than otherwise comparable cements treated with $CO_2$ after hardening. Bulk carbonation of cementitious materials produces several beneficial effects, including reducing permeability of the cement, increasing its compressive strength, and reducing its pH. These effects are produced rapidly, and extend throughout the bulk of the cement—they are not limited to a surface layer, as are prior methods of post-hardening $CO_2$ treatment. The method may be used with any cement or concrete composition, including those made with waste products such as fly ash or cement slag. Surface carbonation is almost instantaneous, and bulk carbonation deep into a form is rapid. By combining molding, curing, and carbonation into a single step, carbon dioxide is better distributed throughout the entire specimen or form, producing a uniform product.

6 Claims, No Drawings

U.S. PATENT DOCUMENTS

| | | | |
|---|---|---|---|
| 5,307,876 A | 5/1994 | Cowan et al. | 106/790 |
| 5,435,843 A | 7/1995 | Roy et al. | 106/705 |
| 5,518,540 A | 5/1996 | Jones, Jr. | 106/638 |
| 5,650,562 A | 7/1997 | Jones, Jr. | 73/38 |
| 5,690,729 A | 11/1997 | Jones, Jr. | 106/682 |
| 5,897,704 A | 4/1999 | Baglin | 106/696 |
| 5,918,429 A | 7/1999 | Hicks et al. | 52/181 |

PRESSURE-ASSISTED MOLDING AND CARBONATION OF CEMENTITIOUS MATERIALS

This is a continuation of co-pending application Ser. No. 09/170,480, filed Oct. 13, 1998, now allowed with the issue fee paid; which claims the benefit of the Oct. 15, 1997 filing date of provisional application Ser. No. 60/109,799 under 35 U.S.C. § 119(e); the entire disclosures of both of which prior applications are hereby incorporated by reference.

This invention pertains to carbonation of cementitious materials, particularly to carbonation of cements using supercritical or high density carbon dioxide.

Above a compound's "critical point," a critical pressure and temperature characteristic of that compound, the familiar transition between gas and liquid disappears, and the compound is said to be a "supercritical fluid." Supercritical fluids (SCFs) have properties of both gasses and liquids, in addition to unique supercritical properties. A supercritical fluid is compressible like a gas, but typically has a density more like that of a liquid. Supercritical fluids have been used, for example, as solvents and as reaction media. The critical pressure and temperature for carbon dioxide are 1071 psi and 31.3° C. The viscosity and molecular diffusivity of a supercritical fluid are typically intermediate between the corresponding values for the liquid and the gas. Compounds below, but near, the critical temperature and pressure are sometimes termed "near-critical."

Hardened or cured cements have sometimes been reacted with high pressure or supercritical $CO_2$ to improve their properties. Supercritical and near-critical $CO_2$ increase the mobility of water that is already present in the cement matrix, water bound as hydrates and adsorbed on pore walls. A pore in the cement may initially contain supercritical or near-critical $CO_2$ at the pore entrance, a dispersed water phase associated with the pore walls, and possibly free water at the $CO_2$/water interface. The high $CO_2$ pressure increases the solubility of $CO_2$ in the dispersed aqueous phase. A concentration gradient of $CO_2$ is thus produced in the concrete pores. Carbon dioxide may then react with various cement components, particularly hydroxides of calcium. (As used in the specification and claims, the term "hydroxides of calcium" includes not only $Ca(OH)_2$, but also other calcareous hydrated cement components, e.g., calcium silicate hydrate.)

Densification Reactions

Carbonation reduces the permeability of cement, typically by 3 to 6 orders of magnitude. This reduction in permeability has been attributed to precipitation of carbonates in the micropores and macropores of the cement. For example, in cement grout carbonation shifts a bimodal pore distribution (pores around 2–10 nm in diameter and pores around 10–900 nm) to a unimodal distribution (pores around 2–10 nm in diameter only). Reduced permeability and smaller pore diameters slow rates of diffusion in carbonated cements. For example, Cl⁻ and I⁻ diffusion coefficients have been reported to be 2 to 3 orders of magnitude lower in carbonated cement than in noncarbonated cement, as have carbon-14 migration rates. (Lower Cl⁻ and I⁻ diffusion rates indicate greater resistance to salt intrusion. Salt intrusion is undesirable, as it can lead to fracturing or cracking.) Curing cement grout with carbon dioxide increases the strength and dimensional stability of a cement. The pH of cement in fully carbonated zones is lowered from a basic ~13 to a more neutral value of ~8, allowing the reinforcement of the cement with polymer fibers such as certain polyamides (e.g., nylons) that are incompatible with normal cements.

Carbonation of cement is a complex process. All calcium-bearing phases are susceptible to carbonation. For calcium hydroxide (portlandite) the reaction is

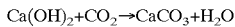

$$Ca(OH)_2 + CO_2 \rightarrow CaCO_3 + H_2O$$

The calcium carbonate may crystallize in one of several forms, including calcite, aragonite and vaterite. Calcite is the most stable and common form.

In this reaction, calcium hydroxide ($Ca(OH)_2$) is assumed first to dissolve in water, after which it reacts with $CO_2$. Following reaction, the calcium carbonate ($CaCO_3$) precipitates. Atmospheric concentrations of $CO_2$ (~0.04%), do not react appreciably with completely dry concrete. Conversely, if the concrete pores are filled with water, carbonation at low pressure essentially stops before bulk carbonation of a thick cement form can occur, because the solubility and diffusivity of $CO_2$ in water are low under such conditions. However, bulk carbonation of cement can occur at atmospheric pressure and ambient temperatures after years of exposure to atmospheric carbon dioxide.

High pressure conditions have previously been used to carbonate the surface layers of hardened cements. However, problems resulting from bulk carbonation of hardened cements have been reported. For example, the volume changes associated with conversion of calcium hydroxide to calcium carbonate have been reported to cause microcracking and shrinkage, at least under certain conditions.

Supercritical Fluids in Cementitious Materials

Supercritical and near-critical fluids confined in narrow pores have properties that are often quite different from those of a bulk gas. Because supercritical fluids are highly compressible, a surface or wall potential can produce a strong, temperature-dependent preferential adsorption, which might not occur at all at lower fluid densities. For example, a water layer on the solid surfaces is believed to be necessary to initiate carbonation reactions. Water is, in turn, a product of carbonation. At lower pressures water can completely fill the pores and thereby limit or even prevent carbonation; in such cases the sample must be dried for carbonation to resume. However, saturation and supersaturation of water in a $CO_2$-rich phase is possible at high pressure, because phase separation in the concrete pores is slower than the carbonation reaction. Also, at high pressures carbon dioxide may adsorb onto the solid surfaces, along with water. The pore environment may eventually consist of a fluid phase of water and dissolved $CO_2$, with mostly water but some $CO_2$, adsorbed onto the walls of the concrete pores. At high pressures solubility of $CO_2$ in water increases.

E. Reardon et al., "High Pressure Carbonation of Cementitious Grout," *Cement and Concrete Research*, vol. 19, pp. 385–399 (1989) discloses treating a solid, hardened, cementitious grout with carbon dioxide gas at pressures up to 800 psi, and notes that this process can sometimes cause physical damage to specimens, including fracturing due to dehydration and shrinkage.

J. Bukowski et al., "Reactivity and Strength Development of $CO_2$ Activated Non-Hydraulic Calcium Silicates, *Cement and Concrete Research*, vol. 9, pp. 57–68 (1979) discloses treating non-hydraulic calcium silicates with $CO_2$ up to 815 psi, and notes that both the extent of the carbonation reaction and the compressive strength of the carbonated materials increased with treatment pressure.

U.S. Pat. No. 4,117,060 discloses a method for the manufacture of concrete, in which a mixture of a cement, an aggregate, a polymer, and water were compressed in a mold, and exposed to carbon dioxide gas in the mold prior to compression, so that the carbon dioxide reacts with the other ingredients to provide a hardened product.

U.S. Pat. No. 4,427,610 discloses a molding process for cementitious materials, wherein the molded but uncured object is conveyed to a curing chamber and exposed to ultracold $CO_2$.

U.S. Pat. No. 5,518,540 discloses treating a cured cement with dense-phase gaseous or supercritical carbon dioxide. The patent also mentions using supercritical carbon dioxide as a solvent to infuse certain materials into a hardened cement paste. See also U.S. Pat. No. 5,650,562.

U.S. Pat. No. 5,051,217 discloses a continuous stamping and pressing process for curing and carbonating cementitious materials. $CO_2$ was admitted at low pressures, and could later be compressed to higher pressures in one segment of the apparatus, a segment through which an after-hardening cement mixture passed continuously. The apparatus was said to be quasi-gas-tight. Only a portion of the uncured form was subjected to high pressure at any given time. The ratio of the mass of $CO_2$ to the mass of the uncured cement was relatively low, apparently always under 0.002 (extrapolating from data given in the specification).

F. Knopf et al., "Densification and pH Reduction in Cement Mixtures Using Supercritical $CO_2$," Abstract of paper to be presented at 1997 annual meeting of the American Institute of Chemical Engineers, available on the Internet in July 1997 at http://www1.che.ufl.edu/meeting/1997/annual/session/100//h/index.html discloses some of the inventors' own work, work that is disclosed in greater detail in the present specification.

We have discovered that a superior method to rapidly carbonate large cement forms or structures is to shape and harden the cement in a mold under high carbon dioxide pressure, at supercritical, near-supercritical, or high $CO_2$ density conditions. In other words, contrary to previous teachings, supercritical, near-supercritical, or high density $CO_2$ is reacted with cement while the cement is still in an uncured state. The novel carbonation method is more reliable, efficient, and effective than are post-molding treatments with high-pressure $CO_2$, or treatments using low temperature, low pressure $CO_2$. The novel method is more effective and reliable than methods that admit relatively small amounts of $CO_2$ to a mold at relatively low pressure, and then compress the uncured mixture. The novel method is more effective in penetrating voids with $CO_2$, and is therefore more efficient in converting hydroxides of calcium to $CaCO_3$. Cements molded in the presence of high-pressure $CO_2$ are significantly denser than otherwise comparable cements having no $CO_2$ treatment, and are also significantly denser than otherwise comparable cements treated with $CO_2$ after hardening.

The novel bulk carbonation of cementitious materials produces several beneficial effects, including reducing permeability of the cement, increasing its compressive strength, and reducing its pH. These effects are produced rapidly, and extend throughout the bulk of the cement—they are not limited to a surface layer, as are prior methods of post-hardening $CO_2$ treatment. The novel method may be used with any cement or concrete composition, including those made with waste products such as fly ash or cement slag. Surface carbonation is almost instantaneous, and bulk carbonation is rapid even with forms several centimeters thick, tens of centimeters thick, or thicker. By combining molding, curing, and carbonation into a single step, carbon dioxide is better distributed throughout the entire specimen or form, producing a uniform carbonated cement product. In particular, it is believed that this is the first cured cement in which all interior portions of the cement that are at least 1 mm from the nearest surface of the cement comprise interlocking calcium carbonate crystals that are at least 10 $\mu$m in diameter.

Bulk carbonation of cement with supercritical $CO_2$ in our laboratory has produced a dense layer of interlocking calcium carbonate (calcite) crystals in minutes. The crystals are an order of magnitude larger in diameter (~10 $\mu$m) than has been previously reported for calcite crystals in the interior of cements. The novel process produces concretes with improved durability and higher compressive strengths.

Uses for concretes based on the novel, bulk-carbonated cements are numerous. The higher compressive strength allows the use of thinner blocks and less material for a given strength requirement. For example, the stronger concrete may be used to make lighter weight, fire-resistant structural panels or roofing tiles. Cement roofing is rapidly gaining acceptance. These roofs last essentially for the lifetime of the home, have a Class A fire rating, and can be cast into any desired appearance. Costs should be competitive with those for shorter-lived asphalt roofing materials.

Low-cost reinforcing fibers may be used in bulk carbonated cements due to the near-neutral pH of these materials. Many potential reinforcing fibers are incompatible with the higher pH found in most cements, e.g. the pH ~13 of conventional Portland cements. For example, it has been estimated that 3–4 billion pounds of carpet fiber per year are land-filled in the United States. Recycled carpet polymers could instead be used to reinforce these cement structures of near-neutral pH, transforming old carpets from a waste product into a useful resource.

Carbonated cementitious materials can also be used for building artificial reefs. Near-neutral pH's are necessary for the growth of most marine organisms.

Carbonation and polymer reinforcement produce concretes with greater resistance to chemical attack, a property that is useful, for example, in the petroleum, mining, metallurgical, and chemical industries. Bulk-carbonated cements have essentially no die-swell or warpage, an advantage in the ceramics industry.

Preparation of Carbonated and Molded Samples

Comparison samples using previously cured cements were prepared in an existing SCF continuous treatment system. Liquid $CO_2$ was compressed by a positive displacement diaphragm compressor (American Lewa model ELM-1) to 1500 psi. The compressed $CO_2$ was stored in surge tanks to dampen pressure fluctuations. The pressure was controlled by a Tescom regulator (model 44–1124) to within ±5 psi. Pressure was monitored by a Heise digital pressure gauge (model 710A). The specimen (10 mm by 10 mm by 40 mm) was held in a tube immersed in a Plexiglas 25° C. constant temperature bath. The $CO_2$ flow rate was ~0.8 g/s, and the run time was 1 hour.

A prototype device was constructed to evaluate the novel one-step method for molding, curing, and supercritical (or near-critical or high density) $CO_2$ treatment. Specimens were treated in a simple cylindrical mold operated by a piston, which was sealed on its outer surface by O-rings. $CO_2$ gas (at ~700 psi) was introduced below the piston. The pressure above the piston was rapidly increased using water as a driver fluid. The increased pressure initiated the molding process. As the piston moved rapidly toward the sample, the gas pressure above the sample rose to equalize. But simultaneously the $CO_2$ reacted with the cement, tending to lower the pressure. A 2000 psi water pressure was applied to the piston, and the samples were generally molded for ~3 hours, although shorter or longer times can be used. The molded specimens in the prototype embodiment were cylindrical, 39 mm diameter by 13 mm height. The prototype unit allowed various modes of $CO_2$ addition to be studied, without the complexities inherent in filling the mold with uncured cements under pressure. However, the scope of the invention is not limited by the manner used to fill the mold. The amount of $CO_2$ added to the cement matrix could be readily controlled by adjusting the initial height of the piston above the cement.

Characterization of Chemical and Physical Properties of Cements

The porosities of conventionally cast samples (i.e., conventionally molded without high pressure $CO_2$) and samples produced by the novel process were determined indirectly by measuring surface areas at a fixed initial composition. Higher surface areas are often associated with void-filling and therefore with decreased pore volumes, when small pores are created from larger pores without significant pore closure. The amount of nitrogen or other inert gas adsorbed (in determining surface area) includes contributions from capillary condensation in small pores. However, as voids are completely filled surface areas decrease significantly. A discussion of physical adsorption mechanisms in porous materials can be found in standard works on this subject, for example, D. M. Ruthven, *Principles of Adsorption and Adsorption Processes* (1984).

Thus an increase in surface area upon carbonation indicates a small reduction in voidage, while a decrease in surface area indicates almost complete closure of voids in the specimen, accompanied by densification. Surface areas were estimated using the one-point BET method at 30% relative saturation, using a Micromeritics 2700 Pulse Chemisorption apparatus. Water was first removed under vacuum at 1 torr for 24 h at ambient temperature, then under flowing $N_2$/He for at least 2 h. The surface areas of selected samples were checked by the full BET $N_2$ adsorption method using an Omnitherm (model Omnisorp 360) adsorption apparatus. The pore volume was determined in water by displacement (Archimedes' principle). All specimens used in density and porosity measurements were dried under vacuum at 1 torr at ambient temperature prior to measurement.

A Scintag PAD-V automated X-ray Powder Diffractometer was used to identify crystalline phases. Specimens were step-scanned from 3–60° 2θ, at a 0.02° step size, 3 second/step. A Perkin-Elmer thermogravimetric analyzer was used to quantify weight losses from water evolution (from hydrates), hydroxide (e.g., $Ca(OH)_2$) to oxide (e.g., CaO) conversions, and carbonate (e.g., $CaCO_3$) to oxide (e.g., CaO) conversions. The carrier gas was helium at 1 atm. The temperature program was 200–700° C., 5° C./min, hold at 700° C.

Results, Post-Treated Samples

The "post-treatments" (i.e., carbonations of previously cast samples) used near-critical $CO_2$ (1500 psi and 25° C.). The $CO_2$ density at these conditions was 0.83 g/cm$^3$, well above the density at the critical pressure and temperature (0.46 g/cm$^3$). Table 1 summarizes X-ray diffraction (XRD) results for five different concrete mixes. The samples for the XRD measurements were taken from the surfaces of the specimens. For each mix both a control sample (no carbonation) and a test sample (carbonated) were measured. The reported weights of the additives were normalized to the initial weight of concrete. For all samples, a weight ratio of 0.603 water to 1.0 cement (ASTM Type III) was used in the initial mix. The five mixes represent typical fast set concretes, some of which included one or more of the following additives: glass fibers, Kevlar fibers, calcite, lime, and a plasticizer.

TABLE 1

XRD Phase Characterization of Carbonated Specimens, Continuous Flow Treatment

| | Ratio of XRD peak heights, portlandite/calcite | Additives |
|---|---|---|
| Control 1 | 2.9 | none |
| Test 1 | 0.029 | |
| Control 2 | 3.9 | 0.021 lime |
| Test 2 | <0.035 | 0.007 calcite |
| Control 3 | 4.1 | 0.021 calcite |
| Test 3 | 0.08 | 0.022 WRDA 19 plasticizer |
| Control 4 | 2.6 | 0.105 lime |
| Test 4 | 0.09 | 0.021 calcite |
| Control 5 | 3.6 | 0.105 lime 0.021 calcite 0.022 WRDA 19 plasticizer |
| Test 5 | <0.035 | 0.007 E-glass fiber 0.010 Kevlar 49 fiber |

The portlandite peak reported in Table 1 occurred at 18.1° 2θ, and the calcite peak at 29.5°. The reported ratios of portlandite to calcite are not strictly quantitative, because detailed calibrations of peak height versus the weight of a given phase were not made, and also because careful microtome sectioning procedures were not used. Nevertheless, the five control samples showed a reasonably consistent ratio range, 2.6–4.1.

As compared to the controls, the test samples showed a significant increase in calcite ($CaCO_3$) peak heights, and a corresponding decrease in portlandite ($Ca(OH)_2$) peak heights. The relative ratio of P/C (portlandite/calcite) for the control and test samples (i.e., $(P/C)_{control}/(P/C)_{test}$) ranged from a low of 29 for sample 4 to a high of 111 for sample 2. Despite the semi-quantitative nature of these initial XRD measurements, it is still clear that carbonation caused a 1–2 order of magnitude change in the ratio of portlandite to calcite in samples taken from the surface. These experiments show that the presence of typical cement additives did not hinder the carbonation process substantially.

Scanning electron microscope (SEM) photomicrographs showed qualitatively similar appearances for control and test samples at magnification 33×: individual, rounded sand grains coated with the cement. At higher magnifications, 650× and 3700×, significant differences in the crystalline structures became apparent. Before carbonation, the cement comprised primarily calcium silicate hydrate, calcium hydroxide, and ettringite. The carbonated cement, by contrast, showed large calcium carbonate crystals (average diameter 10 μm), with partially developed crystal faces. The average grain size was an order of magnitude greater than that previously reported for carbonated cements. The calcium carbonate crystals formed interlocking grains, suggesting that permeability of the cement was thereby reduced. Also, adhesion between the carbonated layer and the non-carbonated layer, as well as adhesion between the carbonated layer and aggregate, both appeared to be good.

Derivative thermogravimetric analysis (TGA) of a Portland cement mortar before and after carbonation was used to estimate content of calcium carbonate and hydroxides of calcium. The complex chemical nature of a typical cement precludes exact quantitation by TGA, so the TGA results are considered to provide relative comparisons only. A large increase in calcium carbonate content following carbonation was evident, as was a proportional decrease in the content of hydroxides of calcium. The content of ettringite and other stable hydrates appeared to be unaffected by the carbonation.

The SEM micrographs suggested that surface carbonation was extensive. Derivative thermogravimetry, on the other hand, indicated that about half of the hydroxides of calcium did not undergo any change. This discrepancy is explained by the fact that the SEM probed only the top few micrometers of the surface, while the thermal analysis was representative of the top several millimeters of the sample. Thus the deeper one probed into the sample, the lower the degree of carbonation for the post-treated samples. As shown below, the results were quite different for samples produced by the novel supercritical molding treatment.

Results, Molded Specimens; and Comparisons to Post-Treated Specimens

The details of the treatments and initial compositions used in the molding experiments are given in Tables 2 and 3. All initial cure times were 3 hours. All comparison samples were prepared in the molding device with 2000 psi water pressure on the driver side. Some comparison samples were set with air only (i.e., with no more than ambient levels of $CO_2$.) Some comparison samples were set in air for three hours initially, and the partially cured materials were then contacted with $CO_2$ for an additional two hours.

TABLE 2

Composition and Treatments for Molded Portland Cement (PC) and Fly Ash Samples

| Sample Number and Description | Mass of PC or Fly Ash (g) | Mass of 5 M NaOH Solution, as a Percentage of Mass of PC or Fly Ash | Fiber Type and Mass, as a Percentage of Mass of PC or Fly Ash |
|---|---|---|---|
| 3A-PC, set in air | 50 | 32 | polypropylene, 1.4 |
| 3B-PC, set with $CO_2$ | 50 | 32 | polypropylene, 1.4 |
| 2A-fly ash, set in air | 25 | 40 | none |
| 2B-fly ash, set with $CO_2$ | 25 | 40 | none |
| 11-fly ash, set with water P = 2000 psi, then $CO_2$ | 25 | 40 | none |
| 5-fly ash, set with $CO_2$ | 25 | 45 | polypropylene, 1.6 |
| 15-fly ash, set in air then $CO_2$ | 25 | 40 | polypropylene, 1.6 |
| 16-fly ash, set with $CO_2$, foamed[1] | 25 | 44 | nylon, 1.6 |
| 17-fly ash, set with $CO_2$, foamed[1] | 25 | 44 | polypropylene, 1.6 |

[1]foamed with aqueous solution comprising 73% 5 M NaOH and 27% aqueous (30 wt %) $H_2O_2$

TABLE 3

Composition and Treatments for Molded Cement Slag Samples

| Sample Number and Description | Mass of Cement Slag (g) | Mass of 5 N NaOH Solution, as a Percentage of Mass of Slag | Fiber Type and Mass as a Percentage of Mass of Slag |
|---|---|---|---|
| 4-set with $CO_2$ | 25 | 44 | polypropylene, 1.4 |
| 6-set in air, foamed[1] | 25 | 44 | 0 |
| 8-set in air | 25 | 40 | polypropylene, 1.6 |
| 9-set with $CO_2$ | 30 | 43 | polypropylene, 4.3 |
| 10-set with $CO_2$, foamed[2] | 25 | 45 | 0 |
| 12-set in air, $CO_2$ post-setting | 25 | 45 | 0 |

[1]foamed with aqueous solution comprising 55% 5 M NaOH and 45% aqueous (30 wt %) $H_2O_2$
[2]foamed with aqueous solution comprising 76% 5 M NaOH and 24% aqueous (30 wt %) $H_2O_2$ For the fly ash and cement slag specimens, a 5 M NaOH solution was used to reduce curing times, following the method of U.S. Pat. No. 5,435,843. In some experiments, $H_2O_2$ was used as a foaming agent to see whether it would affect contact between the $CO_2$ and the cements. The Portland cement used was Type I. The fly ash was Class C. The cement slag was standard pig-iron blast furnace slag.

After demolding, sectioned samples were tested for increases in carbonate content by TGA. The reactions used to estimate $Ca(OH)_2$ and $CaCO_3$ content were as follows:

Hydrates→Silicates, Carbonates (T<300° C.)
$MgCO_3$→$MgO+CO_2$ [MW=44] (T ~300–350° C.)
$Ca(OH)_2$ [MW=74.1]→$CaO+H_2O$ [MW=18] (350° C.<T<450° C.)
$CaCO_3$ [MW=100.1]→$CaO+CO_2$ [MW=44] (T>600° C.)
Hydroxylated Silicas, Aluminas→$SiO_2$, $Al_2O_3+H_2O$ (T<650° C.)
Other Carbonates→Oxides+$CO_2$ (T>500° C.)

In most instances the $MgCO_3$ peak could not be resolved from the $Ca(OH)_2$ peak. Also, the final dehydrations of the surfaces of other hydroxides such as $SiO_2$ take place at temperatures that overlap $CaCO_3$ decomposition. The TGA results should therefore be viewed as estimates of the amounts of $Ca(OH)_2$ and $CaCO_3$ in these materials. The TGA results are nevertheless useful in relative comparisons of carbonated versus non-carbonated (but otherwise identical) materials.

Standard samples were used to calibrate appropriate temperature ranges for the dehydration and decarbonation reactions in the TGA analysis. Each standard was a homogeneous physical mixture, containing ⅔ mold specimen 3A (Portland cement, set in air), and ⅓ of the additive being tested. These components were ground to a powder with a mortar and pestle. The additives used in separate samples were as follows: $CaCO_3$, which produced a high-temperature reaction; $Ca(OH)_2$, which produced a range of multiple dehydrations from ~350–450° C.; $Al(OH)_3$, for which bulk dehydration occurred at low temperatures, in the hydrate-loss region; and $Na_2SiO_3$, which produced a peak at ~570–640° C., an evolution of water from silicate surfaces that can affect quantitation of the carbonate peak—however, the relatively small size of this peak suggests that rough quantitation of $CaCO_3$ by TGA is still possible. Tables 4 and 5 give the TGA results for the molded samples. In the Tables, the designations "M" and "T" refer to samples that were removed from the middle of the specimen and the top surface of the specimen, respectively.

TABLE 4

TGA Results, Fly Ash Samples

| Sample | % Water Loss from Hydrates | % Hydroxide as Ca(OH)$_2$ | % Carbonate as CaCO$_3$ |
|---|---|---|---|
| 2A-fly ash, set in air | 2.8 | 9.6 | 6.5 |
| 2B-fly ash, set with CO$_2$ | 1.6 | 3.3 | 13.7 |
| 11T | 2.3 | 6.0 | 5.9 |
| 11M | 2.7 | 5.2 | 6.0 |
| 5M | 0.89 | 3.8 | 10.7 |
| 5T | 0.74 | 4.0 | 11.0 |
| 15-fly ash, set in air, CO$_2$ post-setting | 0.68 | 13.3 | 15.1 |
| 16-fly ash, set with CO$_2$, foamed | 0.55 | 3.7 | 14.5 |

TABLE 5

TGA Results, Cement and Cement Slag Samples

| Sample | % Water Loss from Hydrates | % Hydroxide as Ca(OH)$_2$ | % Carbonate as CaCO$_3$ |
|---|---|---|---|
| 3A, set in air | 1.5 | 16.0 | 5.1 |
| 3B, set with CO$_2$ | 1.3 | 13.4 | 7.0 |
| 4, slag, set with CO$_2$ | 0.86 | 18.5 | 7.7 |
| 6, slag, set in air, foamed | 0.45 | 14.4 | 1.1 |
| 8, slag, set in air | 1.8 | 14.7 | 3.8 |
| 9-slag, set with CO$_2$ | 1.1 | 16.7 | 5.8 |
| 10-slag, set with CO$_2$ foamed | 0.56 | 12.6 | 2.3 |
| 12-slag, set in air, CO$_2$ post-setting | 1.2 | 12.4 | 1.6 |

Note in Table 4 a general increase in measured CaCO$_3$ content for all the CO$_2$-molded samples as compared to the non-carbonated samples. When CO$_2$ was not used directly in the molding process, but was instead applied as a post-cure treatment in the mold, the measured carbonate content sometimes increased (sample 15), and sometimes did not (sample 11). In Table 5 the carbonate content increased where CO$_2$ was used in the molding, except for one of the H$_2$O$_2$-foamed samples. However, the carbonate content did not increase when CO$_2$ was used to treat an already-hardened cement slag (sample 12). These experiments show that the high-pressure CO$_2$ molding process is more reliable and effective than is a post-molding treatment with high pressure CO$_2$.

The CO$_2$ in-situ molded specimens were also denser than the air-molded samples, as seen in Tables 6 and 7. Because carbonation filled pores and cracks in the cement, the dry surface area should decrease upon significant carbonation, as seen in Tables 6 and 7, even when polymer fibers were present. The bulk density of the dry carbonated materials increased, as carbonates are generally denser than hydroxides—with one exception, sample 16, which was a H$_2$O$_2$-foamed sample (compared to non-foamed standard 2A). Similar results were found for cement slags. (See Table 7.) Note that the voidages for the carbonated samples decreased significantly as compared to samples set in air (Tables 6 and 7). These lower voidages demonstrate that the novel carbonated cementitious materials possess excellent barrier properties, e.g. to ionic transport. The decreased ionic permeabilities lend these cements to uses such as housing and marine applications. In addition, reinforcing polymer fibers blended with such cements would be less susceptible to degradation by reaction with ions transported in water, especially saltwater or wastewater.

TABLE 6

Porosity and Density Results, Fly Ash Samples

| Sample | BET Surface Area, m$^2$/g | Bulk density, kg/m$^3$ | Voidage (based on water displacement: (sample volume-water displaced)/sample volume |
|---|---|---|---|
| 2A-fly ash, set in air | 8.5 | 1.82 | 0.18 |
| 2B-fly ash, set with CO$_2$ | 5.4 | 1.94 | 0.065 |
| 5-fly ash, set with CO$_2$ | 8.4 | 1.95 | 0.049 |
| 15-fly ash, set in air, then CO$_2$ | 5.7 |  | 0.049 |
| 16-fly ash, set with CO$_2$, foamed | 4.6 | 1.68 | 0.089 |
| 17-fly ash, set with CO$_2$, foamed | 7.0 | 1.80 | 0.015 |

TABLE 7

Porosity and Density Results, Cement Slag Samples

| Sample | BET Surface Area, m$^2$/g | Bulk density, kg/m$^3$ | Voidage (based on water displacement: (sample volume-water displaced)/sample volume |
|---|---|---|---|
| 4-set with CO$_2$ | 3.8 | 2.00 | 0.14 |
| 8-set in air | 5.8 | 1.69 | 0.29 |
| 9-set with CO$_2$ | 0.4 | 1.93 | 0.14 |
| 10-set with CO$_2$, foamed | 4.7 | 1.93 | 0.15 |

This process can be conducted at any pressure above ~400 psi, preferably between ~600 psi and ~2000 psi. Although there is no upper limit on pressure, as a practical matter it becomes increasingly more difficult to handle fluids above a pressure ~5000 psi. A delivery pressure to the mold of ~700–800 psi is particularly convenient in many applications, because this is the pressure at which carbon dioxide is delivered from a tank of liquid carbon dioxide at room temperature (i.e., this is the vapor pressure of carbon dioxide at room temperature). Subsequent molding would increase the pressure within the mold. The temperature should be between −56° C. (the triple point of CO$_2$) and 200° C., preferably between 0° and 50° C. More specifically, the pressure/temperature combination should be such as to produce a CO$_2$ density near or exceeding the critical density of CO$_2$, 0.46 g/cm$^3$. For example, at 25° C. the density of CO$_2$ in a near-critical state of 1000 psi is 0.74 g/cm$^3$. This density easily suffices to give uniformly carbonated products.

As used in the specification and claims, unless context clearly indicates otherwise, the term "carbon dioxide" refers to any liquid, gas, or supercritical fluid containing a substantial amount of CO$_2$, at least 20% by weight (as measured before reaction with, or dilution into, other components). The term "cement" or "cementitious material" refers to any calcareous material which, when mixed with appropriate amounts of water (and, optionally, other curing additives), can be used as a binder for aggregates formed from materials such as sand, gravel, crushed stone, organic polymers, and other materials. A cement may include such aggregate or polymeric materials as blended mixtures. Examples of cementitious materials include Portland cements, fly ash, and cement slags such as blast furnace slag.

The complete disclosures of all references cited in this specification are hereby incorporated by reference. In the event of an otherwise irreconcilable conflict, however, the present specification shall control.

We claim:

1. A cured cement at least 2 mm thick, wherein all interior portions of said cement that are at least 1 mm from the nearest surface of said cement comprise interlocking calcium carbonate crystals at least 10 μm in diameter.

2. A cement as recited in claim 1, wherein the pH of said cement is below about 8.

3. A cement as recited in claim 2, wherein said cement is reinforced with polymeric fibers that are stable at the pH of said cement.

4. A cement as recited in claim 3, wherein said fibers comprise a polyamide, a polyolefin, a polyamide blend, or a polyolefin blend.

5. A cement as recited in claim 3, wherein said fibers comprise a nylon.

6. A cement as recited in claim 3, wherein said fibers comprise polypropylene.

* * * * *